United States Patent
Borghi

(10) Patent No.: US 8,919,315 B2
(45) Date of Patent: Dec. 30, 2014

(54) INTAKE MANIFOLD OF COMBURENT AIR FOR AN INTERNAL COMBUSTION ENGINE EQUIPPED WITH EGR

(75) Inventor: Gianni Borghi, Albinea (IT)

(73) Assignee: Lombardini S.R.L., Reggio Emilia (IT)

( * ) Notice: Subject to any disclaimer, the term of this patent is extended or adjusted under 35 U.S.C. 154(b) by 0 days.

(21) Appl. No.: 13/600,923

(22) Filed: Aug. 31, 2012

(65) Prior Publication Data

US 2013/0061825 A1    Mar. 14, 2013

(30) Foreign Application Priority Data

Sep. 8, 2011   (IT) .............................. RE2011A0066

(51) Int. Cl.
| | |
|---|---|
| *F02M 35/104* | (2006.01) |
| *F02M 35/10* | (2006.01) |
| *F02M 25/07* | (2006.01) |

(52) U.S. Cl.
CPC ... *F02M 35/10222* (2013.01); *F02M 35/10262* (2013.01); *F02M 35/10354* (2013.01); *F02M 35/1045* (2013.01); *F02M 25/0728* (2013.01); *F02M 25/0735* (2013.01); *Y02T 10/146* (2013.01); *Y02T 10/121* (2013.01)
USPC ................................. 123/184.21; 123/568.17

(58) Field of Classification Search
USPC ........................................ 123/184.21, 568.17
See application file for complete search history.

(56) References Cited

U.S. PATENT DOCUMENTS

| | | | | |
|---|---|---|---|---|
| 5,601,059 | A * | 2/1997 | White et al. ............. | 123/184.21 |
| 5,704,326 | A * | 1/1998 | Minegishi et al. ....... | 123/184.53 |
| 6,032,634 | A * | 3/2000 | Minegishi et al. ....... | 123/184.55 |
| 6,401,699 | B1 * | 6/2002 | Persson et al. .......... | 123/568.12 |
| 7,036,493 | B1 * | 5/2006 | Huebler et al. .......... | 123/568.17 |
| 7,237,541 | B2 * | 7/2007 | Vanderveen et al. .... | 123/568.17 |
| 2006/0060163 | A1 | 3/2006 | Vanderveen et al. | |
| 2006/0075997 | A1 | 4/2006 | Huebler et al. | |
| 2012/0304970 | A1 * | 12/2012 | Schlemmer-Kelling . | 123/568.12 |

FOREIGN PATENT DOCUMENTS

| | | |
|---|---|---|
| DE | 199 40 617 A1 | 3/2000 |
| DE | 10 2004 024 465 A1 | 8/2005 |
| EP | 0764781 A2 | 3/1997 |
| EP | 2 333 292 A1 | 6/2011 |
| WO | 99/40312 A1 | 8/1999 |

\* cited by examiner

*Primary Examiner* — Noah Kamen
*Assistant Examiner* — Grant Moubry
(74) *Attorney, Agent, or Firm* — Volpe and Koenig, P.C.

(57) ABSTRACT

An intake manifold (2) of comburent air is provided for an internal combustion engine (1) with a recirculating conduit (60) of exhaust gases. The intake manifold (2) includes a first inlet mouth (213) of the comburent air, a second inlet mouth (214) in communication with the recirculating conduit (60) of the exhaust gases, and a plurality of outlet mouths (201), having a wall (7) positioned in front of each of the outlet mouths (201) and suitable for dividing the internal volume of the intake manifold (2) into two chambers (215, 204), the first chamber (215) being placed in communication with the first inlet mouth (213) and the second inlet mouth (214) and the second chamber (204) being placed in communication with the outlet mouths (201), the wall (7) defining an opening (70) suitable for placing the first chamber (215) and the second chamber (204) in communication.

13 Claims, 4 Drawing Sheets

INTAKE MANIFOLD OF COMBURENT AIR FOR AN INTERNAL COMBUSTION ENGINE EQUIPPED WITH EGR

TECHNICAL FIELD

The present invention relates to an intake manifold of comburent air for an internal combustion engine, usually an internal combustion engine of vehicles, which is provided with an exhaust gas recirculation system.

PRIOR ART

As is known, an internal combustion engine is conventionally provided with an intake manifold, an exhaust manifold, an intake line for conveying fresh air from the environment into the intake manifold, and an exhaust line for conveying the exhaust gas from the exhaust manifold to the environment. With the aim of reducing the polluting emissions, the majority of internal combustion engines, especially Diesel engines, are further provided with a recirculating system of the exhaust gases (EGR), selectively activatable for recirculating a part of the exhaust gases from the exhaust manifold in the intake manifold.

In this way, a fraction of exhaust gas is mixed with the fresh air in inlet and the mixture supplies the engine cylinders, thus reducing the production of nitrogen oxides (NOx) during the combustion process.

Conventional EGR systems exhibit an EGR conduit which places the exhaust manifold in connection with the intake manifold, an EGR heat exchanger of the exhaust gases before mixture with the aspirated air, and an electronically-controlled EGR valve, directly managed by a control board, for regulating the exhaust gas flow rate to be recirculated in the EGR conduit.

The effect of the EGR system is negative if the exhaust gases recirculated are too cold, for example on engine start-up; too-cold exhaust gases can actually have a negative effect on the combustion processes.

For this reason, with the aim of accelerating the heating of the exhaust gases or the engine starting from the engine, the EGR system might further comprise a bypass conduit, connected in parallel to the EGR heat exchanger, and a further valve which selects the passage of the exhaust gases in the bypass conduit, thus preventing passage of the exhaust gases internally of the EGR heat exchanger during the initial cold start-up phases of the motor or in other appropriate operating situations.

The intake manifold therefore comprises a first inlet mouth communicating with the intake line and a second inlet mouth communicating with the EGR conduit (and/or the by-pass conduit) and a plurality of outlet mouths, each communicating with a respective cylinder of the engine.

The EGR systems of known type, however, are not free of drawbacks, among which is the fact that the fresh air and the exhaust gases in inlet into the intake manifold, are not always sufficiently mixed with one another, so that the distribution of the exhaust gas among the engine cylinders is not always optimal, and gives rise to a non-homogeneous combustion among the various cylinders, which makes the whole recirculating system not particularly efficient.

In particular, in the cylinders in which a quantity of fresh air will enter which is greater than what is desired, a greater formation of NOx will occur following the combustion, while in cylinders where a quantity of gas that is greater than the expected amount enters, a lower combustion temperature will be obtained, with a consequent greater production of uncombusted materials and particulate.

An aim of the present invention is to obviate the above-mentioned drawbacks in the prior art, with a solution that is simple, rational and relatively inexpensive.

The aims are attained by the characteristics of the invention as reported in the independent claims. The dependent claims delineate preferred and/or particularly advantageous aspects of the invention.

DISCLOSURE OF THE INVENTION

In particular the invention discloses an intake manifold of the comburent air for an internal combustion engine provided with a recirculating conduit of the exhaust gases, wherein the intake manifold comprises a first inlet mouth which will be placed in communication with a supply line of the comburent air, a second inlet mouth which will be set in communication with the recirculating conduit of the exhaust gases, and a plurality of outlet mouths, each of which is suitable for being placed in communication with a respective cylinder of the internal combustion engine.

In the invention, the intake manifold comprises at least a wall positioned in front of each of the outlet mouths and suitable for dividing the internal volume of the intake manifold into two chambers, the first chamber being set in communication with the first inlet mouth and the second inlet mouth and the second chamber being set in communication with the outlet mouths, the wall defining an opening destined to set the first chamber and the second chamber in communication.

Thanks to this solution, the mixture of the fresh air and the exhaust gases in the intake manifold is optimised, at the same time optimising the controllability and efficiency of the combustion process in the engine cylinders.

Further, the recirculated exhaust gases and the fresh air are uniformly mixed with each other and uniformly distributed to the outlet mouths, with considerable advantages in terms of uniformity of the combustion in the cylinders.

An aspect of the invention is, further, that the opening is substantially dealigned with respect to the outlet mouths, the opening and the wall defining a substantially dogleg pathway between the inlet mouths and the outlet mouths.

Thus, the flow of gas (fresh air and exhaust gas) is forced to follow a tortuous path internally of the manifold intake, such as to ensure optimum mixing of the two gases.

In a still further aspect of the invention, the intake manifold comprises deflector means associated with the wall at the position of opening, for reducing the load loss of the gases crossing the opening as they pass from the first chamber to the second chamber.

Thanks to this detail, the passage of the gas mixture through the opening of the wall results in a limited load loss and gases are conveyed into the second chamber towards the outlet thereof.

In addition, in a further aspect of the invention a box casing is comprised, with a substantially tub-shaped body in which the outlet mouths are comprised, fixable to the head of the internal combustion engine, and a lid fixed to the tub body, with an interposing of seal elements, in which the first inlet mouth and the second inlet mouth are defined.

Further, the perimeter edge of the wall is advantageously suitable for being removably constrained by clamping between the tub body and the lid, the seal elements being interposed, between the wall and, respectively, the tub body and the lid.

In this way the wall can be easily removed, for cleaning, maintenance and/or replacement.

In a further aspect of the invention an engine is provided, comprising a plurality of combustion cylinders and provided with an intake manifold, as described above, and provided with an exhaust manifold and an exhaust gas recirculation system destined to recirculate part of the exhaust gases exiting from the exhaust manifold entrance in inlet to the intake manifold.

BRIEF DESCRIPTION OF THE DRAWINGS

Further characteristics and advantages of the invention will emerge from a reading of the following description, given by way non-limiting example, with the aid of the figures illustrated in the attached drawings.

BEST MODE FOR CARRYING OUT THE INVENTION

Figure 1:
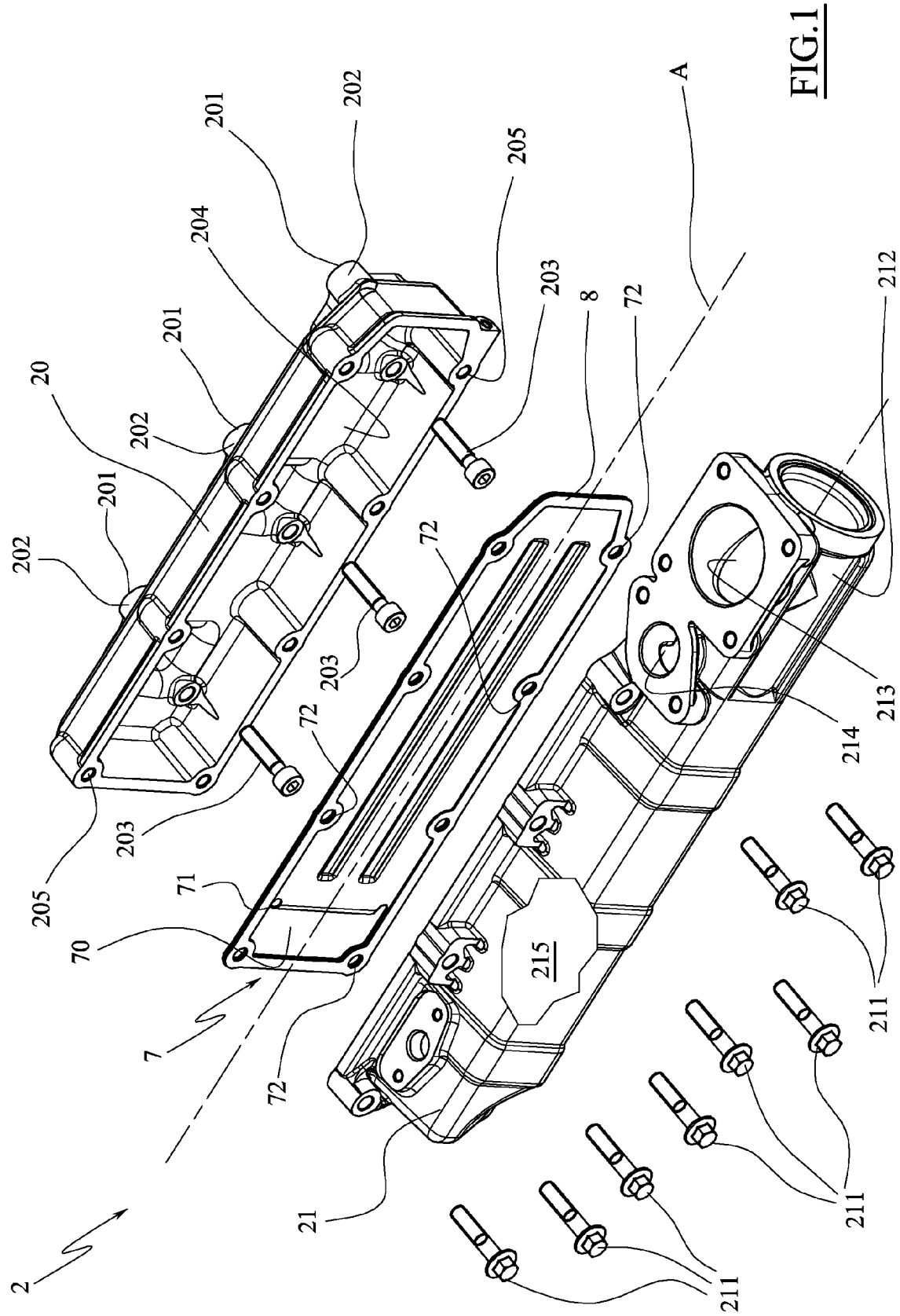
FIG. 1 is an axonometric exploded view of the manifold intake of the invention.
Figure 2:
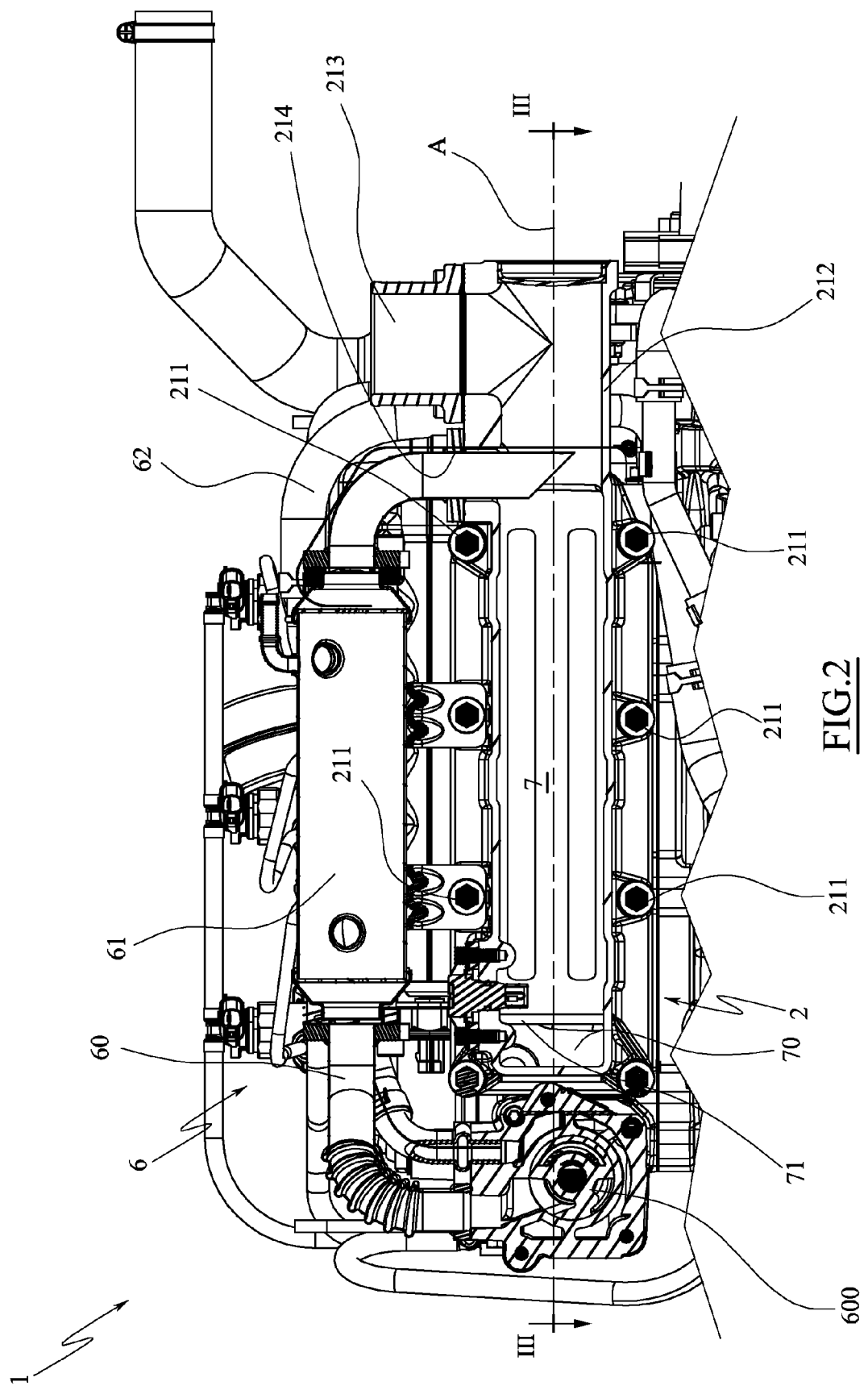
FIG. 2 is a lateral view of a detail of the head of the internal combustion engine including the intake manifold FIG. 1, partially sectioned respect to a longitudinal plane.

With particular reference to the figures of the drawings, an internal combustion engine is denoted in its entirety by reference numeral 51, in this case a Diesel motor.

The internal combustion engine 1 has an intake manifold 2 and an exhaust manifold 3.

The intake manifold 2 is connected to an intake line 4 for transporting fresh air from the environment into the internal combustion engine 1, while the exhaust manifold 3 is conventionally connected to an exhaust line 5 such as to convey the exhaust gases from the internal combustion engine 1 into the environment.

The internal combustion engine 1 is equipped with an exhaust gas recirculation system (EGR), denoted in its entirety by 6, which is provided for recycling and supply of the exhaust gases into the internal combustion engine 1 in order to reduce emissions of nitrogen oxides (NOx).

The EGR system 6 comprises a recirculation conduit 60 which connects the exhaust manifold 3 directly to the intake manifold 2 and a heat exchanger device 61, generally called an EGR cooler, which is in fluid communication with the recirculation conduit 60, for cooling the exhaust gases that flow into it.

The heat exchanger 61 is of a conventional type, for example with a tube bundle or plates, and the exhaust gas flowing into the recirculation conduit 60 is cooled by it, for example, with a coolant that also cools the engine 1 or which, alternatively, is dedicated only to the cooling of exhaust gases. To this end, the heat exchanger 61 is hydraulically connected to a circuit of a coolant fluid, known in the sector, in which the coolant fluid is maintained physically separated from the exhaust gases to be cooled.

In more detail, a valve 600 is associated upstream or downstream of the heat exchanger 61 with the recirculation conduit 60, the EGR valve, controlled by an electric control board, being of a type known to a technical expert in the field, and being suitable for regulating the exhaust gas flow overall directed from the exhaust manifold 3 to the intake manifold 2 through the recirculation conduit 60.

Figure 4:
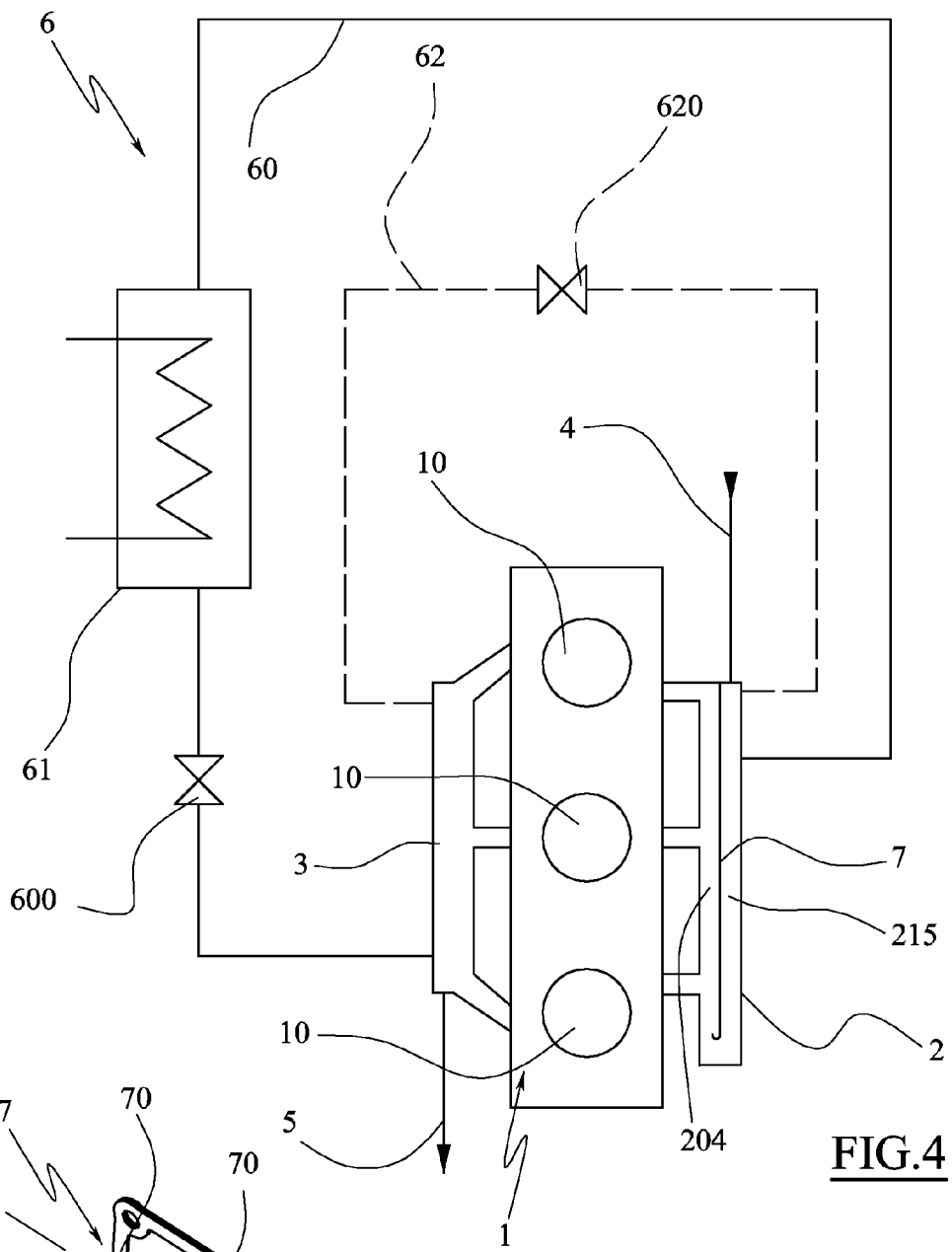
FIG. 4 is a schematic view of the internal combustion engine of the invention, equipped with the exhaust gas recirculation system.

Further, the EGR system 6 may comprise a bypass conduit 62, which is indicated only by way of example in a broken line in FIG. 4, which is connected in parallel to the heat exchanger 61, for example, on the recirculation conduit 60 or directly connected (upstream of the gas crossing direction) with the exhaust manifold 3 and downstream of the the manifold intake 2.

In this case, a valve 620 is associated with the bypass conduit 62 in order to selectively allow or block the flow of exhaust gases through the bypass itself.

The intake manifold 2, as shown in FIG. 1, comprises an elongate box-shaped casing with a longitudinal axis A, provided with a substantially tub-shaped body 20, in which a plurality of outlet mouths 201 are realised, which branch from the bottom of the tub body 20 in the form of tubular connections 202, which for example, exhibit an axis that is perpendicular to the bottom of the tub body, but can also be arranged differently.

The tub body 10 is fixed to the head of the motor 1 by first mounting screws 203, such that each outlet mouth 201 is set in fluid communication with a cylinder 10 of the internal combustion engine 1.

In the illustrated example the internal combustion engine 1 comprises 3 cylinders.

In practice, the output mouths 201 face the respective 11 air supply lines (mixed with the exhaust gases) made in the head of the internal combustion engine 1, which lead directly into the cylinder 10, through conical-seat valves 12 (in the present embodiment 2) enslaved to the cylinder.

The intake manifold 2 further comprises a lid 21 attached to the tub body 20, for example by means of screws 211 with the interposition of seal elements of the seal 8 type.

The cover 21 is further substantially tub-shaped and a hollow shank 212 originates from a lateral wall thereof, which shank 212 has an axis that is longitudinally substantially parallel to the longitudinal axis A of the casing.

A first inlet 213 is afforded on the lateral wall of the hollow shank 212 (upper in FIG. 1), which can be placed in fluid communication with a supply line (shown only schematically in FIG. 4) of the fresh comburent air aspirated from the outside environment.

A second inlet mouth 214 is further afforded on the lateral wall of the hollow shank 212, which is placed in fluid communication with the terminal branch of the recirculation conduit 60, in which the exhaust gases cooled by the heat exchanger 61 are recirculated.

In the illustrated example, a further second inlet mouth (not shown in the figures) might be obtained in the side wall of the hollow shank 212 suitable for being placed in fluid communication with the terminal branch of the bypass conduit 62, in which the exhaust gases that have not been made to pass through the heat exchanger 60 recirculate, for example as they are already sufficiently cool (engine start-up) or because their thermal contribution is used to heat the engine.

The intake manifold 2 comprises at least a wall 7 provided with at least an opening 70, which can divide the internal volume of the box casing 2 of the intake manifold into two chambers communicating with each other through the opening 70; the first chamber 215 is, for example, defined by the internal volume of the lid 21 and is placed in communication with the first inlet mouth 213 and the mouth second inlet mouth 214, while the second chamber 204 is, for example, defined by the internal volume of the tub body 20 and is placed in communication with the output mouths 201.

The wall 7 is advantageously positioned in front of the outlet mouths 201, i.e. it lies in a substantially parallel plane to the longitudinal axis A of the box casing of the manifold inlet 2 and exhibits zones that are aligned with the outlet mouths 201 along the longitudinal axis of tube connections 202.

In practice, the opening 70 is substantially dealigned in plan view with respect to the longitudinal axis of the tube connections 202; the wall 7 thus defines, via the opening 70, a connector which defines a substantially dog-leg shaped connection between the first chamber 215 and the second chamber 204 such as to increase the turbulence of the gases (air and exhaust gases) which cross the intake manifold 2, at the same time mixing the gases.

Further, the presence of the wall and the opening 70 thereof inside the intake manifold 2 enables the distance that the gases must travel in order to move from the respective inlet mouths 213 and 214 to the outlet mouths 201 to be increased, thus enabling an improvement in the mixing conditions between the air and exhaust gases.

The wall 7 is plate-shaped, substantially rectangular and superposes, closing both the open end (opposite the bottom) of the tank body 20 and the lid 21. In the embodiment shown in the figures, the opening 70 is an (also rectangular) opening, perimetrally closed and made at a side area of the wall 7, i.e. able to be placed, in use, in a distal zone from the first and the second inlet mouth, respectively 213 and 214.

The wall 7 further comprises deflector means fixed at a side of the opening 70 and configured such as to reduce load loss of the gases (air and combusted gases) crossing the opening itself, when they pass from the first chamber 215 to the second chamber 204.

The deflector means, in the present example, comprise a lug 71 originating from the lateral edge of the opening 70 in proximity of the output ports 201 and bent in a U-shape on the wall 7, such as to produce a rounding of the sharp edge that the wall forms in the crank connection defined internally of the intake manifold 2.

For example, the wall 7 is made from a metal plate in which the opening 70 is obtained by cutting, a lateral edge of which (which faces towards the central zone of the wall) is bent on the wall 7 on the side which, in use, is destined to be facing towards the outlet mouths 201.

It is however possible that the wall 7 can be realised in a different material and with different forming techniques.

The wall 7 is removably associated to the casing of the intake manifold 2.

In particular, the perimeter edge of the wall 7 is removably constrained and clamped between the tub body 20 and the lid 21, interposed between them when, by means of the second screws 211, the lid 21 is fixed to the tub body. In the present example, the perimeter edge 7 of the wall, which delimits the wall zone 7 separating the two chambers 204 and 215, comprises a series of eyelets 72 suitable for receiving, with play, the second screws 211 themselves, which then screw into appropriate threaded seatings 205 afforded in the free and of the tub body 20.

The sealing elements, i.e. the seal 8, is configured such as to be interposed both between the wall 7 and the tank body 20, and between the wall 7 and the lid 21.

For example, the seal 8 can be a single seal, having a substantially C shape, ring-closed on itself and suitable for bordering the perimeter edge of the wall 7 in such a way as to laterally clad it on both sides; alternatively two distinct annular seals can be comprised, fixed on opposite sides with respect to the wall 7.

The seal 8 (or seals) can be fixed to the perimeter edge of the wall 7, for example by gluing or inserting in suitable housing slots.

Alternatively, the seal 8 can be fixed to the perimeter edge 7 of the wall by co-moulding, for example injection moulding, with the perimeter edge of the wall itself.

The functioning of the intake conduit 2, in the embodiment of the figures, is the following.

The fluid (fresh air and exhaust gas), which enters through the hollow shank 212 into the first chamber 215, longitudinally crosses the first chamber 215 and is retained in the first chamber 5 by the wall 7.

Figure 3:
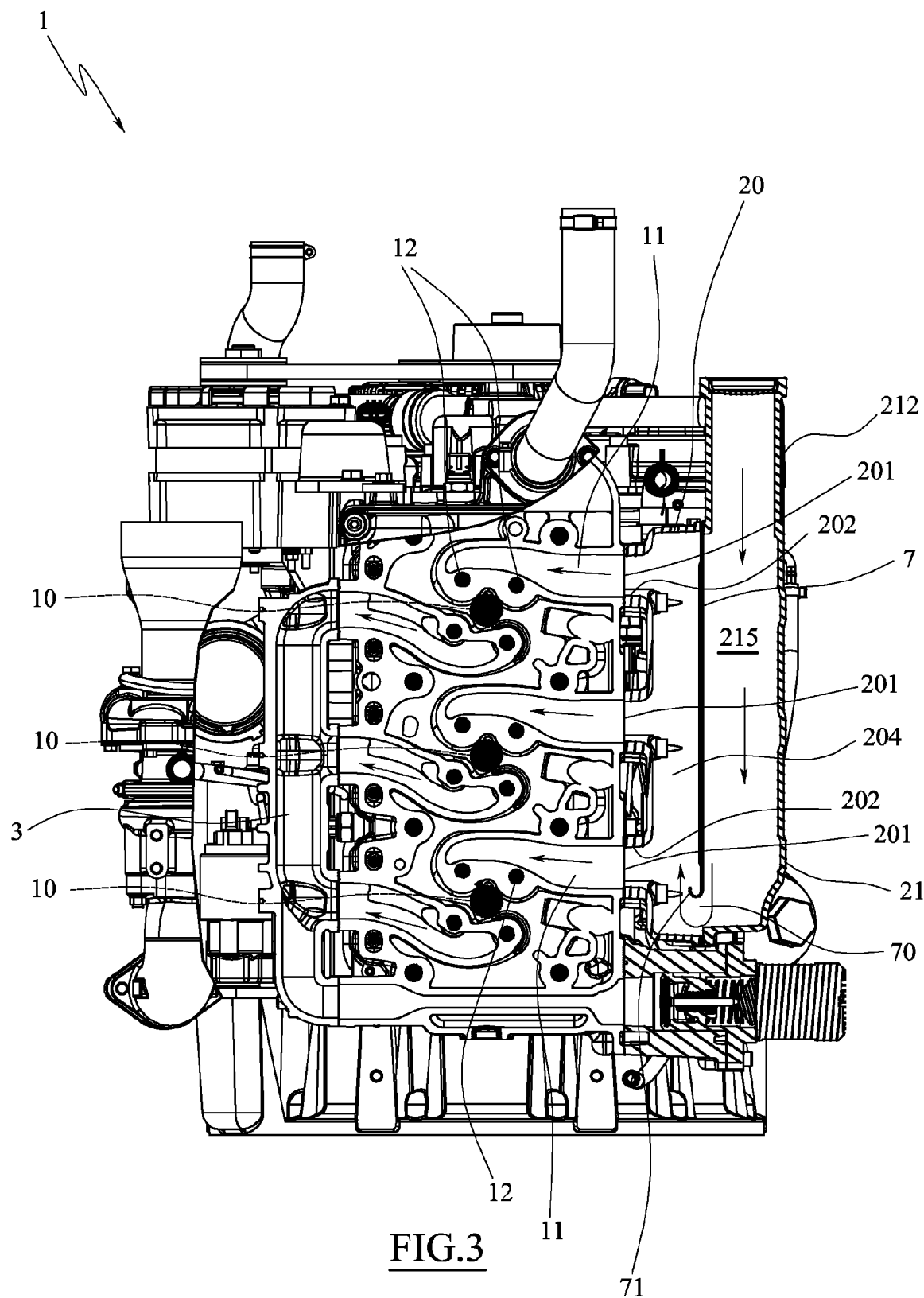
FIG. 3 is a view from above of the combustion engine of FIG. 2, partially sectioned along section line III-III of FIG. 2.

Once the opening 70 has been reached, the fluid passes into the second chamber 204 following the dogleg path of the wall 7, as shown in FIG. 3.

The dogleg bend the fluid passes round enables optimal mixing of the fresh air with the exhaust gases.

The fluid is then forced back through the intake conduit 2 along the second chamber 204 and from there enters the tubular connections 202, then to be fed into the respective cylinders 10.

Figure 5:
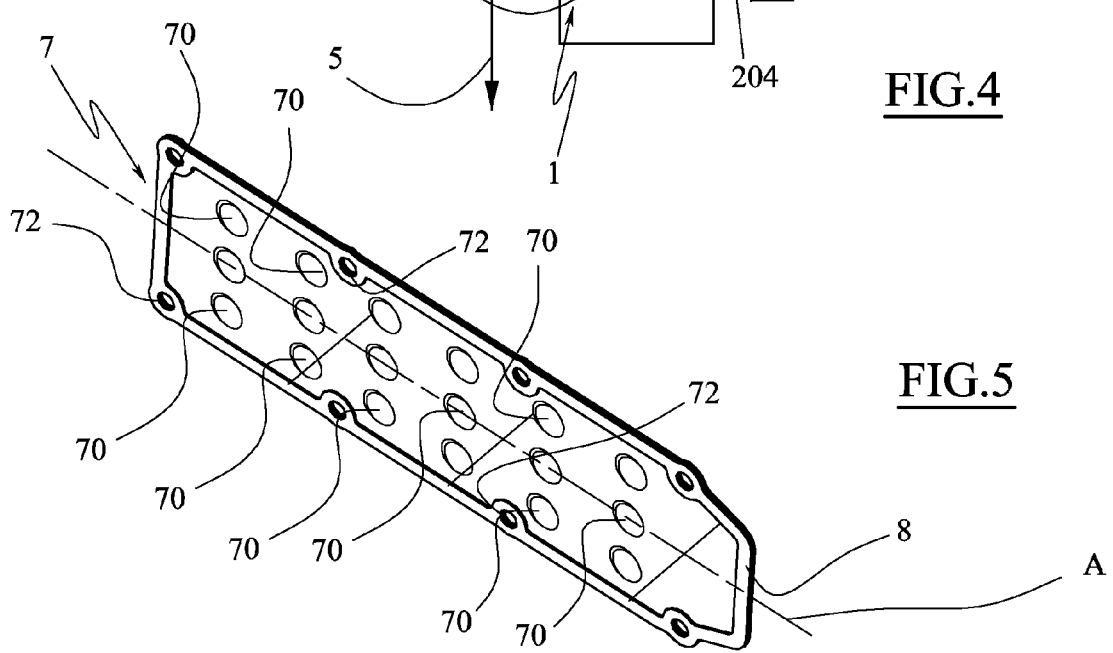
FIG. 5 is an axonometric view of an alternative embodiment of a wall, according to the invention.

An alternative embodiment of the wall 7, of which a first example is shown in FIG. 5, comprises a plurality of openings 70, as described above, separate from one another and distributed in the wall zone which is destined to divide the two chambers 204 and 215.

The openings 70 are afforded in the wall 7 at the each outlet mouth 201 (facing in proximity thereof) in such a way as each to be dealigned with respect to the longitudinal axis of the respective tubular connection 202 serving the outlet mouths themselves. In practice, in this embodiment the wall 7 is composed of closed portions 25 alternated with a series of openings 70 aligned vertically as shown in FIG. 5 (it is alternatively possible that a single vertically elongate opening is present), in which each closed portion is at least partially aligned (along the longitudinal axis of the tube connector 202) to an outlet mouth 201 while each series of openings 70 precedes and follows (with respect to the longitudinal axis A of the wall 7) a closed portion.

The fluid, which enters the first chamber 215 via the hollow shank 212, crosses the wall 7 via the openings 70 and, being deviated by the closed portions of the wall 7 that define dogleg paths between the chambers 215 and 204, passes into the second chamber 204, mixing fresh air with the exhaust gas, and enters the respective connection tube 202 in order then to be supplied into each cylinder 10.

The openings 70 can also be variously positioned in the wall 7 and can be of any shape and dimension, according to constructional requirements.

The wall 7, in this embodiment too, comprises the deflector means, i.e. a plurality of lugs 71 associated, as described above, to each opening or possibly to only some thereof.

The invention as it is conceived is susceptible to numerous changes and variants, all falling within the ambit of the inventive concept. Further, all the details can be replaced by other technically-equivalent elements.

In practice the materials used, as well as the contingent shapes and dimensions, may be any according to needs, without forsaking the ambit of protection of the following claims.

The invention claimed is:

1. An intake manifold (2) of comburent air for an internal combustion engine (1) having a recirculating conduit (60) of exhaust gases, wherein the intake manifold (2) comprises a box casing, which includes a substantially tub-shaped body (20) fixable to the head of the internal combustion engine and a lid (21) fixed to the tub-shaped body (20), a first inlet mouth (213) provided through a lateral wall of the lid (21) and configured to be placed in communication with a supply line (4) of the comburent air, a second inlet mouth (214) provided through the lateral wall of the lid (21) parallel to the first inlet mouth (213) and configured to be placed in communication with the recirculating conduit (60) of the exhaust gases, and a plurality of outlet mouths (201) each provided in the tub-shaped body (20) and configured to be placed in communication with a respective cylinder (10) of the internal combustion engine (1), at least a wall (7) having a perimeter edge constrained removably by clamping between the tub-shaped body (20) and the lid (21), and seal elements (8) interposed between the perimeter edge of the wall (7) and, respectively, the tub-shaped body (20) and the lid (21), the wall (7) is positioned in front of each of the outlet mouths (201) and divides an internal volume of the intake manifold (2) into two chambers (215, 204), the first chamber (215) being placed in communication with the first inlet mouth (213) and the second inlet mouth (214) and the second chamber (204) being placed in communication with the outlet mouths (201), the wall (7) defining a single opening (70), which is positioned in a distal zone from the first and second inlet mouth (213, 214) and permits the first chamber (215) and the second chamber (204) to be in communication with each other, wherein the seal elements (8) include two distinct annular seals fixed on opposite sides of the wall (7).

2. The intake manifold (2) of claim 1, wherein the seal elements (8) comprise at least an annular gasket (8), which borders the perimeter edge of the wall (7).

3. The intake manifold (2) of claim 2, wherein the gasket (8) exhibits a section that is substantially C-shaped, such as to cover the wall (7) laterally from both sides.

4. The intake manifold (2) of claim 1, wherein the seal elements (8) are fixed to the perimeter edge of the wall (7), by at least one of: gluing, friction, or comoulding with the perimeter edge of the wall.

5. The intake manifold (2) of claim 1, wherein each opening (70) is substantially not aligned with respect to the outlet mouths (201), the opening (70) and the wall (7) defining a substantially dogleg pathway between the inlet mouths (213, 214) and the outlet mouths (201).

6. The intake manifold (2) of claim 1, further comprising a deflector (71) associated to the wall (7) at the at least an opening (70), deflector is configured to reduce load loss in the gases crossing the opening (70) as they pass from the first chamber (215) to the second chamber (204).

7. The intake manifold (2) of claim 6, wherein the deflector comprises a lug (71) deriving from the lateral edge of the opening (70) proximal to the outlet mouths (201) and folded into a U-shape on the wall (7), such as to realize a substantially dogleg connection between the first chamber (215) and the second chamber (204).

8. The intake manifold (2) of claim 1, wherein the wall (7) comprises a plurality of said openings (70).

9. The intake manifold of claim 8, wherein each opening (70) is provided in the wall (7) in proximity of each outlet mouth (201), the openings (70) being not aligned with respect to the respective outlet mouths (201).

10. The intake manifold (2) of claim 1, further comprising a hollow shank (212) which derives from the first chamber (215) with a longitudinal axis that is parallel to a longitudinal axis (A) of the manifold, the first inlet mouth (213) and the second inlet mouth (214) being arranged on a lateral surface of the hollow shank (212).

11. An internal combustion engine (1) comprising a plurality of cylinders and provided with an intake manifold (2), according to claim 1, an exhaust manifold (3) and an exhaust gas recirculation system (6) configured to recirculate part of exhaust gases from the exhaust manifold (3) in to the intake manifold (2).

12. An intake manifold (2) of the comburent air for an internal combustion engine (1) having a recirculating conduit (60) of exhaust gases, wherein the intake manifold (2) comprises a box casing, which includes a substantially tub-shaped body (20) fixable to the head of the internal combustion engine and a lid (21) fixed to the tub-shaped body (20), a first inlet mouth (213) provided in the lid (21) and configured to be placed in communication with a supply line (4) of the comburent air, a second inlet mouth (214) provided in the lid (21) and configured to be placed in communication with the recirculating conduit (60) of the exhaust gases, and a plurality of outlet mouths (201) each provided in the tub-shaped body (20) and configured to be placed in communication with a respective cylinder (10) of the internal combustion engine (1), at least a wall (7) having a perimeter edge constrained removably by clamping between the tub-shaped body (20) and the lid (21), and seal elements (8) interposed between the perimeter edge of the wall (7) and, respectively, the tub-shaped body (20) and the lid (21), the wall (7) is positioned in front of each of the outlet mouths (201) and divides an internal volume of the intake manifold (2) into two chamber (215, 204), the first chamber (215) being placed in communication with the first inlet mouth (213) and the second inlet mouth (214) and the second chamber (204) being placed in communication with the outlet mouths (201), the wall (7) defining at least an opening (70), which permits the first chamber (215) and the second chamber (204) to be in communication with each other, wherein each opening (70) is substantially not aligned with respect to the outlet mouths (201),the opening (70) and the wall (7) defining a substantially dogleg pathway between the inlet mouths (213, 214) and the outlet mouths (201), and wherein the wall (7) comprises a U-shaped deflector (71) positioned along an edge of the opening (70) closest to the first inlet mouth (213) and configured to reduce load loss in the gases crossing the opening (70) as they pass from the first chamber (215) to the second chamber (204).

13. An intake manifold (2) of claim 12, wherein the seal elements (8) include two distinct annular seals fixed on opposite sides of the wall (7).

\* \* \* \* \*